(12) United States Patent
Agrawal

(10) Patent No.: US 8,397,114 B2
(45) Date of Patent: Mar. 12, 2013

(54) AUTOMATED REGRESSION TESTING INTERMEDIARY

(75) Inventor: Amit Agrawal, London (GB)

(73) Assignee: Morgan Stanley, New York, NY (US)

( * ) Notice: Subject to any disclaimer, the term of this patent is extended or adjusted under 35 U.S.C. 154(b) by 127 days.

(21) Appl. No.: 13/150,546

(22) Filed: Jun. 1, 2011

(65) Prior Publication Data

US 2012/0311392 A1   Dec. 6, 2012

(51) Int. Cl.
*G06F 11/00* (2006.01)
*G06F 9/44* (2006.01)

(52) U.S. Cl. ............. 714/738; 714/31; 714/46; 717/124

(58) Field of Classification Search .................. 714/738, 714/741, 742, 724, 31, 35, 25, 33, 37, 38, 714/46; 717/124, 134, 135
See application file for complete search history.

(56) References Cited

U.S. PATENT DOCUMENTS

| | | | |
|---|---|---|---|
| 6,775,824 B1 * | 8/2004 | Osborne et al. | 717/125 |
| 6,834,361 B2 * | 12/2004 | Abbott | 714/42 |
| 7,194,479 B1 * | 3/2007 | Packham | 717/124 |

* cited by examiner

*Primary Examiner* — Christine Tu
(74) *Attorney, Agent, or Firm* — Weitzman Law Offices, LLC

(57) ABSTRACT

An automated regression testing intermediary configured to accept a first set of automated test instructions from an application testing tool. A data structure comprising predefined fields is configured so when a test instruction is received from the application testing tool, a command will be used to identify at least one field of the data structure that will be populated with a parameter test instruction. A library of generic target automated test instructions is provided. Each generic test instruction has a form and format different from the received test instruction. The intermediary is configured to select generic target automated test instructions from the library and populate selected generic target automated test instructions with parameters obtained from the data structure such that the resulting created target-specific automated test instructions can be used to regression test the application under test.

15 Claims, 3 Drawing Sheets

AUTOMATED REGRESSION TESTING INTERMEDIARY

BACKGROUND

1. Field

This disclosure relates generally to software testing, and, more particularly, to automated regression testing.

2. Background

Test automation uses software to control the execution of tests. The execution of testing, comparison of experimental outcomes to predicted outcomes, preparation of test preconditions, and other test control/reporting functions may be automated utilizing test automation software. Automation tools, therefore, include actions such as, for example, object identification, operations on objects and reading object properties. However, test automation tools often suffer from compatibility issues with the application under test ("AUT"). Compatibility issues between automation tools and the AUT are sometimes solved with the use of "add-ins," which are software elements that extend functionality when added to the test automation tools.

The add-ins, however, are often insufficient to resolve all compatibility issues. The add-ins may be unstable, or they may fail to implement control for some or all of the actions. The appropriate add-ins may not even exist. These difficulties are compounded when the add-ins are weakly supported (if at all) by the developer of the test automation tool. There is the option to switch to another automation tool, but users still face the prospect of incomplete automation and weak developer support from other automation tools. As a result, users may be negatively impacted by compatibility problems and performance issues.

BRIEF SUMMARY

In one aspect of this disclosure, a computer apparatus is disclosed, comprising at least one programmable processor and data storage accessible by the processor. The processor is operatively connected to the data storage to receive information from the data storage. The data storage includes programming which, when executed by the processor, implements an automated regression testing intermediary. The automated regression testing intermediary is configured to receive, from an application testing tool, a first set of automated test instructions intended for regression testing of an application under test. The first set comprises at least one automated test instruction, which comprises a command and a parameter. A data structure comprises predefined fields such that, when the automated test instruction from the first set is received, the command in the automated test instruction will be used to identify a field of the data structure that will be populated with the parameter from the automated test instruction. A library of generic target automated test instructions is stored in the data storage, the generic target automated test instructions having a form and format different from automated test instructions of the first set, and being usable to regression test the application under test when a generic target automated test instruction is selected and populated with the parameter from the automated test instruction to create a target-specific automated test instruction. The automated regression testing intermediary is configured to select at least one generic target automated test instruction from the library based on the field populated with the parameter, and populate the selected generic target automated test instruction with the parameter obtained from the data structure, so that the resulting created target-specific automated test instruction can be used to regression test the application under test.

In another aspect of this disclosure, a method performed by an automated regression testing intermediary is disclosed, comprising receiving, using a processor, a first set of automated test instructions from an application testing tool usable for regression testing of an application under test. The first set comprises at least one automated test instruction, the automated test instruction comprising a command and a parameter. A predefined field of a data structure to be populated with the parameter from the automated test instruction is identified from the received automated test instruction based upon the command. The predefined field of the data structure is populated with the parameter. A generic target automated test instruction is identified from a library of generic target automated test instructions, based on the predefined field, the generic target automated test instruction having a form and format different from the automated test instruction of the first set. The identified generic target automated test instruction is populated with the parameter to create a target-specific automated test instruction that can be used to regression test the application under test.

The foregoing has outlined rather generally the features and technical advantages of one or more embodiments of this disclosure in order that the following detailed description may be better understood. Additional features and advantages of this disclosure will be described hereinafter, which may form the subject of the claims of this application.

BRIEF DESCRIPTION OF THE DRAWINGS

This disclosure is further described in the detailed description that follows, with reference to the drawings, in which.

DETAILED DESCRIPTION

The disclosed automated regression testing intermediary (referred to "ART intermediary" hereinafter) operates by interposing an intermediary between the automation tool (and its respective add-ins) and the AUT. Because the ART intermediary can be built on any respective technology, the technology may be selected so that it is both well-supported by the automated regression testing add-ins, and compatible with the AUT. This eliminates compatibility issues between the add-ins and the AUT. Similarly, because the user controls the ART intermediary, the user may implement any action desired for testing the AUT, and is no longer dependant upon third parties for the support and development of add-ins.

Figure 1:
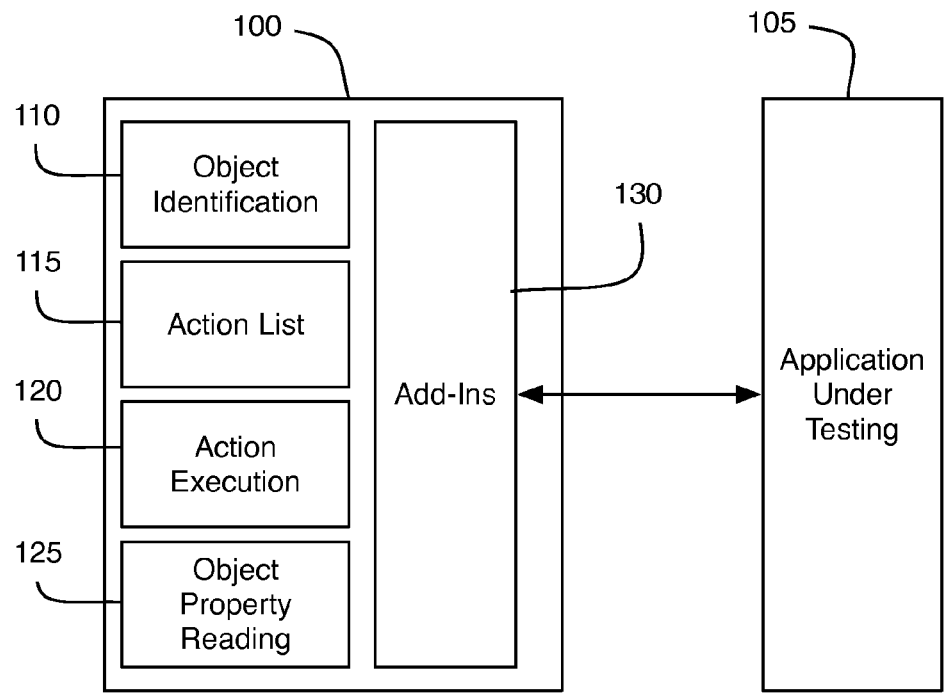
FIG. 1 is a high level representation of automated regression testing performed without the aid of an automated regression testing intermediary.

The following may be illustrative of the problems inherent in current implementations of testing systems. FIG. 1 is a high level representation of automated regression testing performed without the aid of an ART intermediary. Automated testing tool 100 is the tool used to test an AUT 105. Generally, the automated testing tool 100 performs actions on the AUT 105 to iterate through a range of possible user actions on the AUT 105. Results are received from this testing to determine whether any action or sequence of actions causes errors with the AUT 105. Therefore, automated testing tool 100 may include a number of action sets, such as object identification 110, objection action list 115, action execution 120 and object property reading 125.

The automated testing tool 100 may include add-ins 130. Add-ins 130 extend the functionality of the automated testing tool 100 so that it may interface with (and thus automate) the AUT 105. Unfortunately, the add-ins 130 often fail to adequately support the AUT 105 platform, causing deficient performance or failure to implement functions (such as object identification 110, objection action list 115, action execution 120 and object property reading 125).

For example, the AUT 105 may be rendered using commercially available graphical products for rendering such interfaces, such as Windows Presentation Foundation®. Similarly, the automated testing tool may be implemented in Hewlett-Packard QuickTest Professional®. Unfortunately, add-ins developed by Hewlett-Packard for QuickTest Professional® do not adequately support Windows Presentation Foundation™, therefore causing poor performance, or even the inability to execute certain actions (such as those related to object identification 110, objection actions 115, action execution 120 and object property reading 125).

Figure 2:
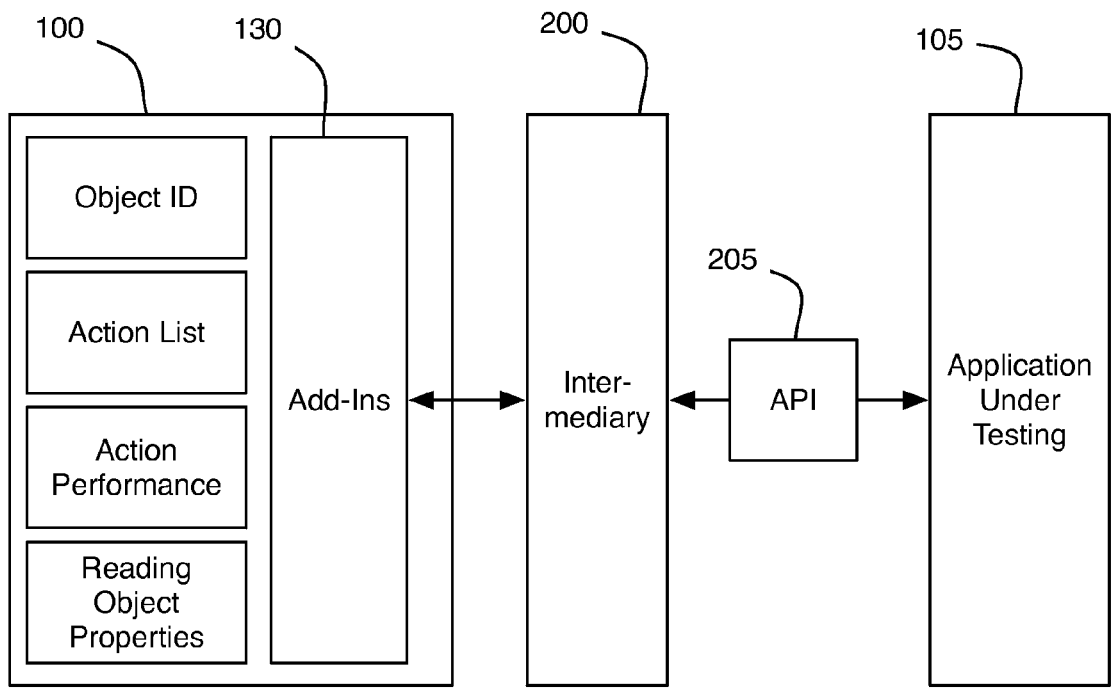
FIG. 2 is a high level representation of an automated regression testing intermediary interposed between an automated testing tool and an AUT.

FIG. 2 is a high level representation of a new, preferred configuration having an ART intermediary 200 interposed between the automated testing tool 100 and the AUT 105 of FIG. 1. As described above, the ART intermediary 200 is built on technology that is supported by add-ins 130 for the automated testing tool 100, and also compatible with AUT 105. This would eliminate compatibility issues between the automated testing tool 100 and the AUT 105, and remove the reliance on third-party developer support for add-ins 130, since any additional functions may be enacted within the framework of the ART intermediary 200. An application programming interface ("API") 205 may be provided to aid the ART intermediary 200 in executing functions upon the AUT 105.

Continuing the above example, an ART intermediary 200 may be, for example, beneficially developed in Visual Basic® .NET™, because there is ample add-in 130 support from Hewlett-Packard for integrating QuickTest Professional™ with Visual Basic® .NET™ Similarly, the Visual Basic® .NET™ ART intermediary 200 is well suited (through a .NET™ API 205) for executing functions on a Windows Presentation Foundation™ AUT 105. Users would have complete control over implemented functions, because they would have the capacity to develop additional functions directly in the ART intermediary 200. Similarly there would be no compatibility issues between the automated testing tool 100 and ART intermediary 200. Users would no longer be forced to rely on add-in 130 support from Hewlett-Packard.

Figure 3:
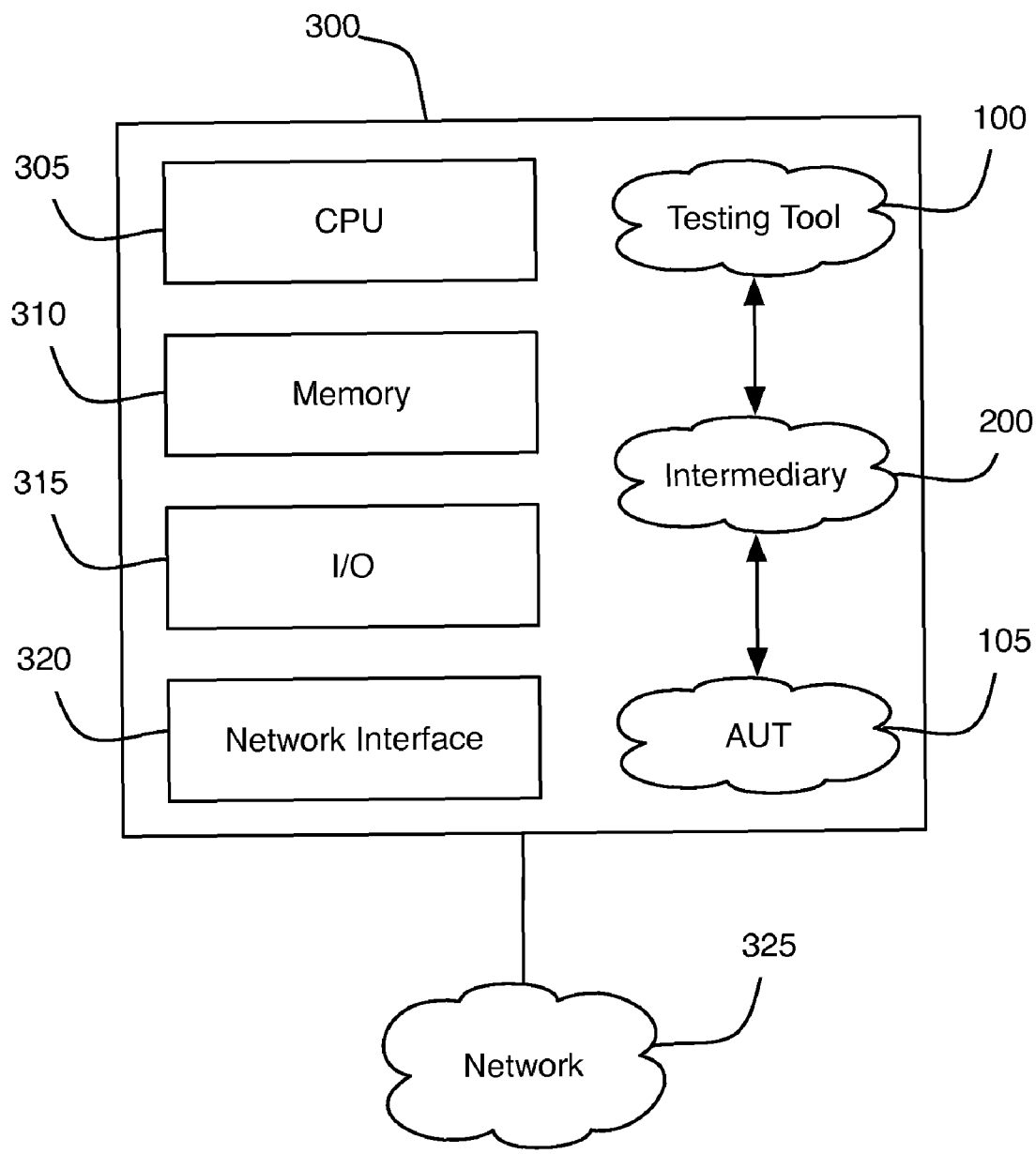
FIG. 3 is a high level representation of a computer system running the automated regression testing intermediary.

FIG. 3 is a high level representation of an illustrative computer system 300 implementing the ART intermediary 200. In one embodiment, ART intermediary 200 typically will be implemented as a software process operating on computer 300. Computer 300 may be any of one or more computing systems of varying configuration. For instance, the components may be combined within a single computing system. Alternatively, operating components may be spread among multiple computer systems. In either case, the computer system 300 (or systems) preferably includes computing components for executing computer program instructions and processes. These components may include a central processing unit (CPU) 305, memory 310, input/output (I/O) devices 315, and a network interface 320.

The CPU 305 processes and executes computer program instructions. Random access memory (RAM) 310 and/or fast access cache memory preferably provides fast data supply to CPU 305. Long-term storage may be provided as a more permanent form of computer memory, and may be, for example, a hard disk, optical disk, flash memory, solid-state memory, tape, or any other type of memory. The database may exist at an onsite facility (if one exists) or, it may be implemented via "cloud-computing" enabled data storage and retrieval. The network interface device 320 may provide the computing system 300 with access to a network 325, which may be a wireless or wired connection. The network 325 may be, for example, the Internet, a corporate intranet, or any other computer network through which the computing system may connect to or otherwise communicate with other computers.

The automated testing tool 100 will typically be a software process that enables automated testing for software applications. As described above, automated software testing utilizes software to set up test conditions, execute tests and analyze test outcomes. Automated testing tools 100 are commonly available on the market, and may include products such as Hewlett-Packard QuickTest Professional®, IBM Rational Functional Tester®, and Microsoft Visual Studio Test Professional®. The AUT 105 will be a software process currently undergoing testing. The AUT 105 may include, for example, a user interface that is currently undergoing testing. The user interface may be rendered utilizing any commercial graphical subsystems used for rendering user interfaces, such as (for example) Windows Presentation Foundation™.

Figure 4:
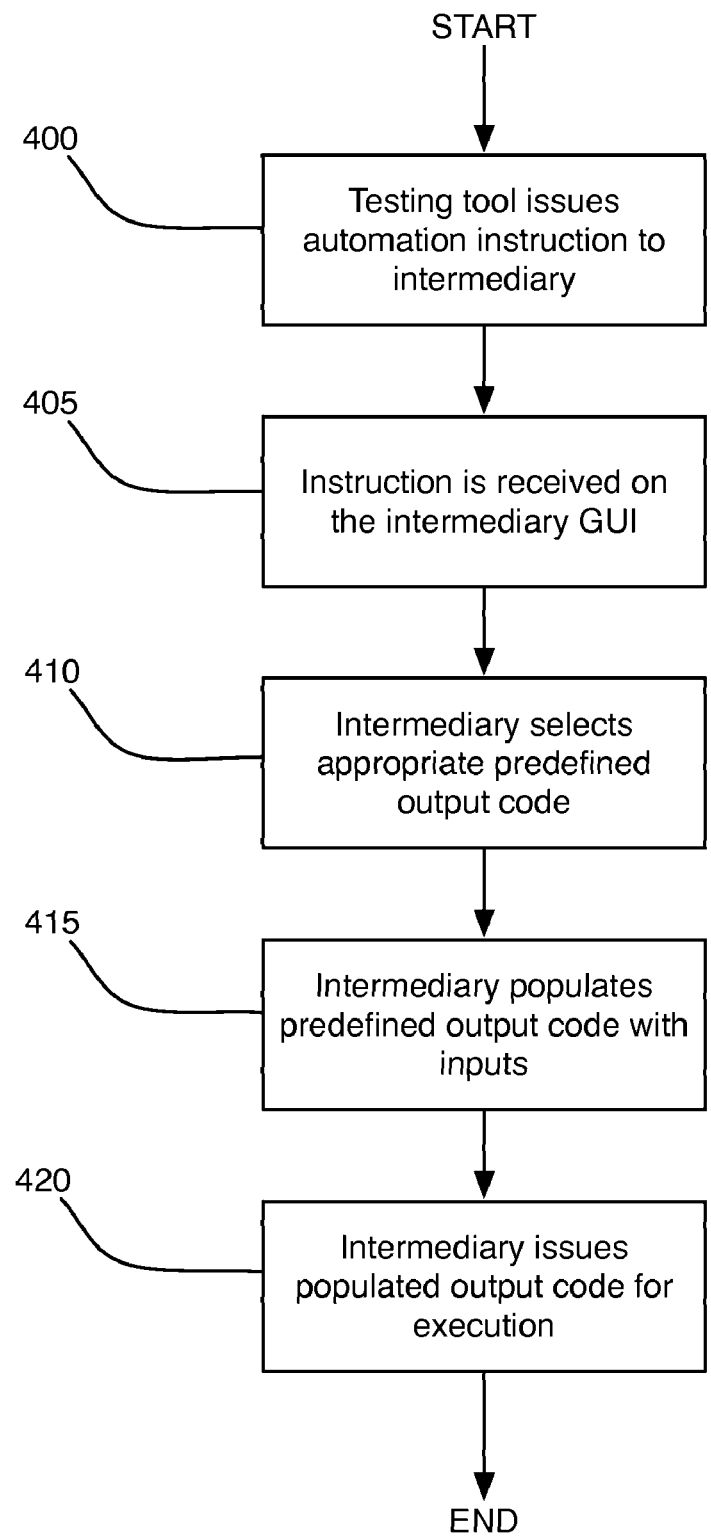
FIG. 4 is a flow chart representing a sequence of steps for implementing an automated regression testing intermediary.

FIG. 4 is a flow chart representing a preferred sequence of steps for implementing an ART intermediary 200. In step 400, the automated testing tool 100 issues an automation instruction to the ART intermediary 200. This instruction may be executed upon a set of predefined actions available to the ART intermediary 200, which correspond to possible function/action categories 110-125 described above (from FIG. 1). For example, the automated regression testing intermediary 200 may include fields for a row index value, column index value, an x-coordinate, a y-coordinate, a range and dir, input value, output value, descriptive path, action to take, class name, action, spying function, a cursor spying function, check, click, click on object, close window, drag and drop, expand, collapse, window existence check, right click on row and select value, column header retrieval, cell data retrieval, test object property retrieval, row count retrieval, general value retrieval, object highlight, maximize form window, minimize form window, select item in cell, select tab or row, set value, uncheck, get process identification, select row and right click, click and take action, right click, search row, return selected row number, set cell data, hover mouse, click menu, click object, etc. Any function may be implemented as desired within the ART intermediary 200 by the user, as he is no longer dependant upon add-in 130 (FIGS. 1 and 2) support from the developer of the automated testing tool 100.

Therefore, an automation instruction, for example, to obtain information from a cell in a grid may contain instructions to set the row value, set the column value, set the description of the grid, read the cell value, and then read the returned output value. In step 405, the instructions are received by the ART intermediary 200. In one embodiment, the instructions operate on a graphical user interface for the ART intermediary 200. Therefore, inputs contained within the instructions may populate corresponding pre-designated fields of the graphical user interface. For instance, a column value input would be inserted into a pre-designated column field on the ART intermediary 200 graphical user interface. These instructions may, for example, be issued by QuickTest Professional® automated testing tool 100 and executed upon a rendered graphical user interface for the Visual Basic® .NET™ based ART intermediary 200.

Subsequently, in step 410, the ART intermediary 200 selects pre-written computer code based on the populated graphical user interface for the ART intermediary 200. Executable code may be generated by combining pre-written computer code with relevant inputs (such as the column value). The corresponding pre-written computer code is identified by a pre-defined association with one or more fields in the ART intermediary 200. For example, a populated column field in the ART intermediary 200 may therefore indicate to the ART intermediary 200 that the corresponding pre-written computer code for setting a column value should be selected for execution.

In step 415, the ART intermediary 200 populates the selected pre-written computer code with the correct inputs. Executable code may be created by simply inserting the relevant inputs populating the input fields of the graphical user interface (i.e. row value, column value, etc.) into the selected pre-written computer code corresponding to the input fields. Continuing the previous example, the pre-written computer code for setting a column value would be populated with the column value input. The ART intermediary 200 will have therefore created corresponding functional output code that, when executed, would set a column value on the AUT 105.

In step 420, the ART intermediary 200 may issue all populated output code for execution. The ART intermediary 200 may execute the code on the AUT 105, or it may be passed to, for example, an API 205 for execution upon the AUT 105. Subsequently, the output code executes upon the AUT 105, thereby initiating actual automated regression testing on the AUT 105.

It is understood that the ART intermediary 200 may be adapted to operate in conjunction with more than one AUT 105 or more than one application testing tool 100. For example, the ART intermediary 200 may be designed to operate in conjunction with multiple AUTs simultaneously. Because different AUTs will often understand different types of computer code instructions, ART intermediary 200 may be adapted to contain multiple libraries of pre-written computer code. ART intermediary 200 would therefore select the appropriate library from which to retrieve pre-written computer code depending on the AUT it is currently operating on. ART intermediary 200 may determine which library to use by any suitable means. For example, the AUT type (and corresponding library) may be designated in advance by a user, the AUT may be queried for such information, the AUT may be analyzed for identifying features, etc.

Multiple application programming interfaces may be utilized to handle a plurality of AUTs. For example, each application programming interface may be designed to operate with a subset of AUTs. The ART intermediary 200 would preferably receive some indication as to which application programming interface to use for a particular AUT. This information may be, for example, pre-indicated to the ART intermediary 200 by a user, contained within an automation instruction, detected by the ART intermediary 200, etc. Subsequently, populated output code would be forwarded to the appropriate application programming interface for execution based on the designated AUT.

ART intermediary 200 may also be adapted to receive input from multiple compatible automated testing tools. Because different automated testing tools may have different output languages, ART intermediary 200 would have the capacity to discern automation instructions from a variety of sources. ART intermediary 200 might accomplish this in a variety of ways. For example, ART intermediary 200 may identify the source (and thus the format) of the automation instruction with a bit of code (prior to the automation instruction itself) indicating the source of the instruction, querying the source of the instruction, or parsing the instruction itself to determine which language should be used to interpret the instruction, etc. A number of libraries may be kept to aid the ART intermediary 200 in decoding automation instructions. Once the format of the automation instruction is known, ART intermediary 200 may utilize the associated library to parse and execute the instruction upon itself, as typical.

Having described and illustrated the principles of this application by reference to one or more preferred embodiments, it should be apparent that the preferred embodiment(s) may be modified in arrangement and detail without departing from the principles disclosed herein and that it is intended that the application be construed as including all such modifications and variations insofar as they come within the spirit and scope of the subject matter disclosed.

What is claimed is:

1. A computer apparatus, comprising:
   at least one programmable processor;
   data storage accessible by the processor, the processor operatively connected to the data storage to receive information from the data storage, wherein the data storage includes programming which, when executed by the processor, implements an automated regression testing intermediary,
   the automated regression testing intermediary being configured to receive, from an application testing tool, a first set of automated test instructions intended for regression testing of an application under test, the first set comprising at least one automated test instruction, the automated test instruction comprising a command and a parameter;
   a data structure comprising predefined fields such that, when the automated test instruction from the first set is received, the command in the automated test instruction will be used to identify a field of the data structure that will be populated with the parameter from the automated test instruction; and
   a library of generic target automated test instructions, stored in the data storage, the generic target automated test instructions having a form and format different from automated test instructions of the first set, and being usable to regression test the application under test when a generic target automated test instruction is selected and populated with the parameter from the automated test instruction to create a target-specific automated test instruction;
   the automated regression testing intermediary being configured to select at least one generic target automated test instruction from the library based on the field populated with the parameter, and populate the selected generic target automated test instruction with the parameter obtained from the data structure, so that the resulting created target-specific automated test instruction can be used to regression test the application under test.

2. The computer apparatus of claim 1, wherein the data structure comprises a rendered graphical interface that includes a visual representation of the field, wherein the parameter is visually displayed in the visual representation of the field when the parameter populates the field.

3. The computer apparatus of claim 1, further comprising at least one application programming interface that receives target-specific automated test instructions and executes the target-specific automated test instructions created by the automated regression testing intermediary upon the application under test.

4. The computer apparatus data architecture of claim 1, wherein the application testing tool is a first application testing tool, and
wherein the automated regression testing intermediary is further configured to:
  i) accept a second set of automated test instructions from a second application testing tool, the second set comprising at least one second automated test instruction having a second form and format different from the form and format of the at least one automated test instruction of the first set, and
  ii) create a second target-specific automated test instruction from the at least one second automated test instruction using the library and the data structure.

5. The computer apparatus of claim 1, wherein the target-specific automated test instruction operates upon a graphical user interface of the application under test as part of automated regression testing of the application under test.

6. The computer apparatus of claim 1, wherein the library comprises a first set of generic target automated test instructions, configured for use with a first application under test, and a second set of generic target automated test instructions, configured for use with a second application under test, the first set of generic target automated test instructions having a different form and format than the second set of generic target automated test instructions.

7. The computer apparatus of claim 6, wherein the automated testing intermediary is configured to send first target-specific automated test instructions populated from the first set of generic target automated test instructions to a first application programming interface for execution on the first application under test, and send second target-specific automated test instructions derived from the second set of generic target automated test instructions to a second application programming interface for execution on the second application under test.

8. A method performed by an automated regression testing intermediary, comprising:
  receiving, using a processor, a first set of automated test instructions from an application testing tool usable for regression testing of an application under test, the first set comprising at least one automated test instruction, the automated test instruction comprising a command and a parameter;
  identifying from the received automated test instruction, based upon the command, a predefined field of a data structured to be populated with the parameter from the automated test instruction;
  populating the predefined field of the data structure with the parameter;
  identifying a generic target automated test instruction, from a library of generic target automated test instructions, based on the predefined field, the generic target automated test instruction having a form and format different from the automated test instruction of the first set; and
  populating the identified generic target automated test instruction with the parameter to create a target-specific automated test instruction that can be used to regression test the application under test.

9. The method of claim 8, further comprising rendering a visual representation of the field in a graphical user interface such that the parameter will be visually displayed in the visual representation of the field when the parameter populates the field.

10. The method of claim 8, further comprising sending the target-specific automated test instruction to an application programming interface that can execute the target-specific automated test instruction upon the application under test.

11. The method of claim 8, wherein the application testing tool is a first application testing tool, and wherein the method performed by the automated regression testing intermediary further comprises:
  i) accepting a second set of automated test instructions from a second application testing tool, the second set comprising at least one second automated test instruction having a second form and format different from the form and format of the at least one automated test instruction of the first set, and
  ii) creating a second target-specific automated test instruction from the at least one second automated test instruction using the library and the data structure.

12. The method of claim 8, wherein the library contains multiple sets of generic target automated test instructions, including a first set of generic target automated test instructions and a second set of generic target automated test instructions, and wherein the method further comprises:
  receiving information indicating whether a first application under test requires use of the first set or the second set; and
  based upon the received information, selecting generic target automated test instructions from the one of the first set or the second set for creating target-specific automated test instructions.

13. The method of claim 12, wherein the received information causes selection of the first set.

14. The method of claim 13, wherein the method further comprises receiving new information and selecting the second set based upon the new information.

15. The method of claim 12, wherein the application programming interface is one of at least two application programming interfaces, the method further comprising, when the received information indicates the first set, using a first of the at least two application programming interfaces and when the received information indicates the second set, using a second of the at least two application programming interfaces.

* * * * *